US009230291B2

(12) United States Patent
Drew et al.

(10) Patent No.: US 9,230,291 B2
(45) Date of Patent: Jan. 5, 2016

(54) LOAD REDUCTION BASED ON PERCENTAGE CHANGE IN ENERGY PRICE

(71) Applicant: Emerson Electric Co., St. Louis, MO (US)

(72) Inventors: David S. Drew, St. Louis, MO (US); Edward B. Evans, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 142 days.

(21) Appl. No.: 14/263,486

(22) Filed: Apr. 28, 2014

(65) Prior Publication Data

US 2014/0236362 A1    Aug. 21, 2014

Related U.S. Application Data

(63) Continuation of application No. 13/647,216, filed on Oct. 8, 2012, now Pat. No. 8,738,186, which is a continuation-in-part of application No. 12/766,155, filed on Apr. 23, 2010, now Pat. No. 8,285,419.

(51) Int. Cl.
  *G05D 23/19* (2006.01)
  *G06Q 50/06* (2012.01)

(52) U.S. Cl.
  CPC ............... *G06Q 50/06* (2013.01); *G05D 23/19* (2013.01); *G05D 23/1923* (2013.01)

(58) Field of Classification Search
  None
  See application file for complete search history.

(56) References Cited

U.S. PATENT DOCUMENTS

| | | | |
|---|---|---|---|
| 6,574,581 B1 | 6/2003 | Bohrer et al. | |
| 6,975,958 B2 | 12/2005 | Bohrer et al. | |
| 7,346,467 B2 | 3/2008 | Bohrer et al. | |
| 7,606,639 B2 | 10/2009 | Miyaji | |
| 7,647,137 B2 | 1/2010 | Schindler | |
| 8,285,419 B2 | 10/2012 | Drew | |
| 2006/0036350 A1* | 2/2006 | Bohrer | F24F 11/006 700/276 |
| 2007/0043478 A1 | 2/2007 | Ehlers et al. | |
| 2007/0208437 A1 | 9/2007 | Schindler | |
| 2009/0125825 A1 | 5/2009 | Rye et al. | |
| 2009/0243517 A1 | 10/2009 | Verfuerth et al. | |
| 2009/0272153 A1* | 11/2009 | Kaltofen | D06F 33/02 68/12.02 |
| 2010/0070103 A1 | 3/2010 | Fleck et al. | |
| 2011/0282497 A1 | 11/2011 | Josephson et al. | |
| 2012/0065805 A1* | 3/2012 | Montalvo | G06Q 10/06 700/297 |
| 2013/0030576 A1 | 1/2013 | Drew et al. | |

* cited by examiner

*Primary Examiner* — Ryan Jarrett
(74) *Attorney, Agent, or Firm* — Harness, Dickey & Pierce, P.L.C.

(57) ABSTRACT

A thermostatic controller generally includes a transceiver configured to receive a signal that includes an energy price rate for a given time period, and an electronic memory device in which one or more energy price rates received by the transceiver are stored. A microprocessor is configured to select the lowest energy price rate received within a given time period for establishing a base energy price rate; determine if the energy price rate for a present time period exceeds the base energy price rate by more than a first percentage or multiplier factor of the base energy price rate; and respond to an energy price rate that exceeds the base energy price rate by more than the first percentage or multiplier factor by transmitting a signal via the transceiver to an energy consuming appliance indicating that the energy consuming appliance should be in an off state and/or to one or more ceiling fans to activate, deactivate and/or change speed of the one or more ceiling fans.

14 Claims, 5 Drawing Sheets

LOAD REDUCTION BASED ON PERCENTAGE CHANGE IN ENERGY PRICE

CROSS-REFERENCE TO RELATED APPLICATIONS

This application is a continuation of U.S. patent application Ser. No. 13/647,216 filed Oct. 8, 2012, which, in turn, is a continuation-in-part of U.S. patent application Ser. No. 12/766,155 filed on Apr. 23, 2010, which issued on Oct. 9, 2012 as U.S. Pat. No. 8,285,419. The entire disclosures of the above applications are incorporated herein by reference.

FIELD

The present disclosure relates to load reduction based on percentage change in energy price, which may include thermostatic controllers for controlling the level of operation of one or more systems to correspond with a time-of-use energy rate, and to thermostatic controllers that can provide demand side management control to an electric utility provider.

BACKGROUND

This section provides background information related to the present disclosure which is not necessarily prior art.

As the demand for electrical power increases during the day, the utility provider experiences an increase in the cost of generating electrical power as a result of secondary "peak" power plants that are switched on to supplement off-peak power generating plants. Many utility providers are consequently establishing real time energy price rates for charging the consumer a variable rate that increases as the cost of generating power increases during peak demand periods. These rates may vary based on a utility price rate schedule, which establishes a different usage price rate for a plurality of specified time periods of the day. Such energy price rates may also be periodically changed by a utility provider.

In situations where the peak demand begins to exceed the power generating capacity of the utility's off-peak and peak power plants, the utility may engage in demand side management by changing the price rate for electrical power during peak demand periods, in an effort to encourage consumers to reduce energy usage to keep energy demand from exceeding capacity. Utilities engaging in demand side management transmit a signal including information about an energy price rate in an attempt to encourage individuals to reduce the amount of energy used during peak demand periods.

In the example of an air conditioner controlled by a conventional thermostat, the user would be billed at a higher rate when the air conditioner runs during peak energy demand periods. Previous attempts have been made to provide a thermostat that receives a signal from a utility provider and offsets the temperature setting during increased demand periods when energy costs are high, to reduce a consumer's energy usage. Such an offset would substantially raise the temperature setting and cause the air conditioner to immediately shut off and remain off until the temperature in the space rises above the significantly raised temperature setting. This would not only allow the utility to lower energy consumption to keep the peak demand from exceeding their capacity, but also the user would be able to save on their energy bill.

But this method of offsetting a thermostat's temperature setting cannot always be relied upon to reduce air conditioner operation and energy consumption, because an occupant may still lower the temperature setting and override the offset. For example, if in response to a utility signal indicating an increase in price rate, a thermostat offset its 72° Fahrenheit temperature setting to 80° Fahrenheit and displayed indicia of a high energy price rate, an occupant of the space may see the 80° set point and lower the setting back to 70° to override the offset. In this case, the utility would not succeed in curbing energy consumption during a peak demand period.

SUMMARY

This section provides a general summary of the disclosure, and is not a comprehensive disclosure of its full scope or all of its features.

An exemplary embodiment includes a thermostatic controller for curtailing load of one or more energy consuming appliances when energy price rate is high. The thermostatic controller generally includes a receiver device configured to receive a signal that includes an energy price rate for a given time period. One or more energy price rates received by the receiver device are stored in an electronic memory device. The thermostatic controller also includes a microprocessor in communication with the receiver device and electronic memory. The microprocessor is configured to control operation of an energy consuming appliance to maintain a set point temperature. The microprocessor includes a memory encoded with an instruction operable to select from the one or more energy price rates the lowest energy price rate received within a given time period for establishing a base energy price rate, and further encoded with an instruction operable to determine if the energy price rate for a present time period exceeds the base energy price rate by more than a first percentage or multiplier factor of the base energy price rate. The microprocessor is configured to respond to an energy price rate that exceeds the base energy price rate by more than the first percentage or multiplier factor by selecting a first temperature offset corresponding to the first percentage or multiplier factor and changing the set point temperature by the first temperature offset.

Another exemplary embodiment includes a thermostatic controller for curtailing load of one or more energy consuming appliances when energy price rate is high. In this exemplary embodiment, the thermostatic controller generally includes a transceiver configured to receive a signal that includes an energy price rate for a given time period. One or more energy price rates received by the transceiver are stored in an electronic memory. The thermostatic controller also includes a microprocessor in communication with the transceiver and electronic memory. The microprocessor is configured to select from the one or more energy price rates the lowest energy price rate received within a given time period for establishing a base energy price rate, and to determine if the energy price rate for a present time period exceeds the base energy price rate by more than a first percentage or multiplier factor of the base energy price rate. The microprocessor is also configured to respond to an energy price rate that exceeds the base energy price rate by more than the first percentage or multiplier factor by transmitting a signal via the transceiver to an energy consuming appliance indicating that the energy consuming appliance should be in an off state.

In another exemplary embodiment, a thermostatic controller generally includes a transceiver configured to receive a signal that includes an energy price rate for a given time period. One or more energy price rates received by the transceiver are stored in an electronic memory. A microprocessor is in communication with the transceiver and electronic memory. The microprocessor is configured to: select from the one or more energy price rates the lowest energy price rate received within a given time period for establishing a base energy price rate; determine if the energy price rate for a present time period exceeds the base energy price rate by more than a first percentage or multiplier factor of the base energy price rate; and respond to an energy price rate that exceeds the base energy price rate by more than the first percentage or multiplier factor by transmitting a signal via the transceiver to one or more ceiling fans to activate, deactivate and/or change speed of the one or more ceiling fans.

Additional embodiments include methods of using thermostatic controllers to curtail load when energy price rate is high. In an exemplary embodiment, a method generally includes receiving a signal that includes an energy price rate for a given time period and storing one or more energy price rates in an electronic memory. The method also includes selecting a lowest energy price rate received within a given period of time from the one or more energy price rates stored in the electronic memory by using a microprocessor in communication with the electronic memory, for establishing a base energy price rate. The method further includes determining, using the microprocessor, if the energy price rate for a present time period exceeds the base energy price rate by more than a first percentage or multiplier factor of the base energy price rate. Additionally, the method includes responding to an energy price rate that exceeds the base energy price rate by more than the first percentage or multiplier factor by selecting, using the microprocessor, a first temperature offset corresponding to the first percentage or multiplier factor and adjusting a set point temperature of an energy consuming appliance by the first temperature offset to thereby reduce energy consumption.

In another exemplary embodiment, a method generally includes receiving a signal that includes an energy price rate for a given time period; storing one or more energy price rates in an electronic memory; and selecting a lowest energy price rate received within a given period of time from the one or more energy price rates stored in the electronic memory by using a microprocessor in communication with the electronic memory, for establishing a base energy price rate. The method also includes determining, using the microprocessor, if the energy price rate for a present time period exceeds the base energy price rate by more than a first percentage or multiplier factor of the base energy price rate; and responding to an energy price rate that exceeds the base energy price rate by more than the first percentage or multiplier factor by transmitting a signal from the thermostatic controller to one or more ceiling fans to activate, deactivate, and/or change speed of the one or more ceiling fans to thereby help reduce energy consumption.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
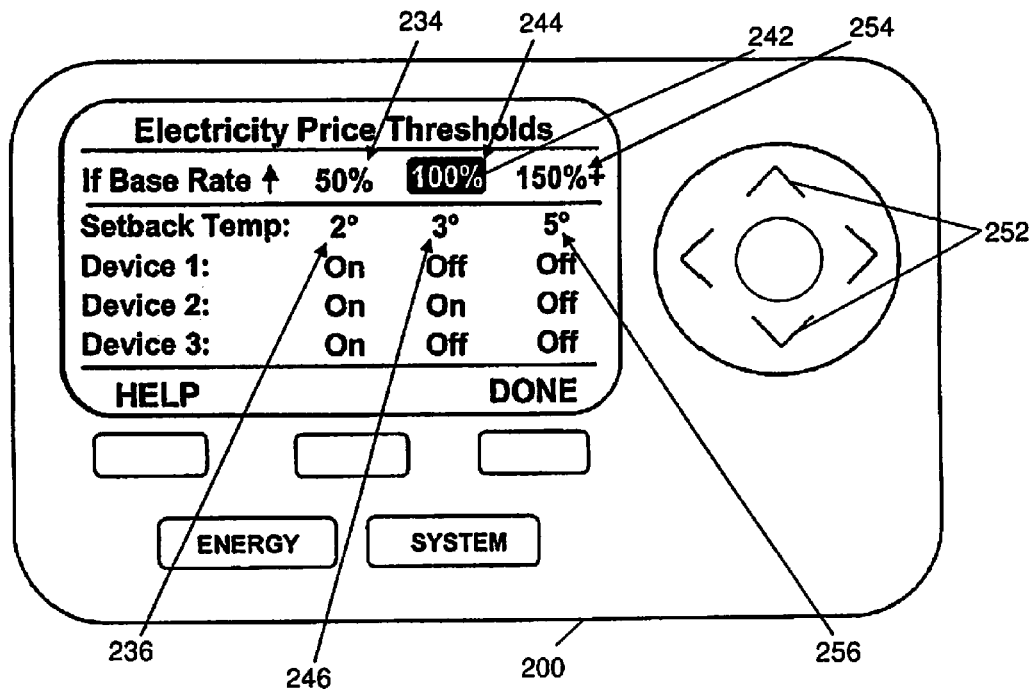
FIG. 3 shows a second embodiment of a thermostat including a display where the thermostat is configured to control operation based on percentage increase in energy price rate in accordance with principles of the present disclosure.
Figure 6:
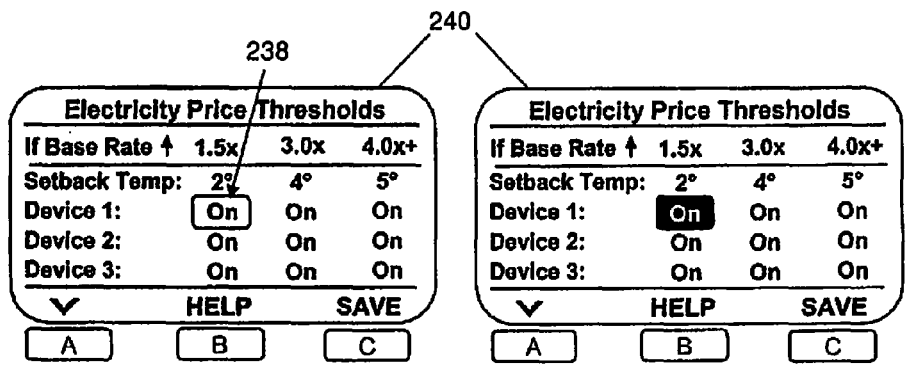
Figure 7:
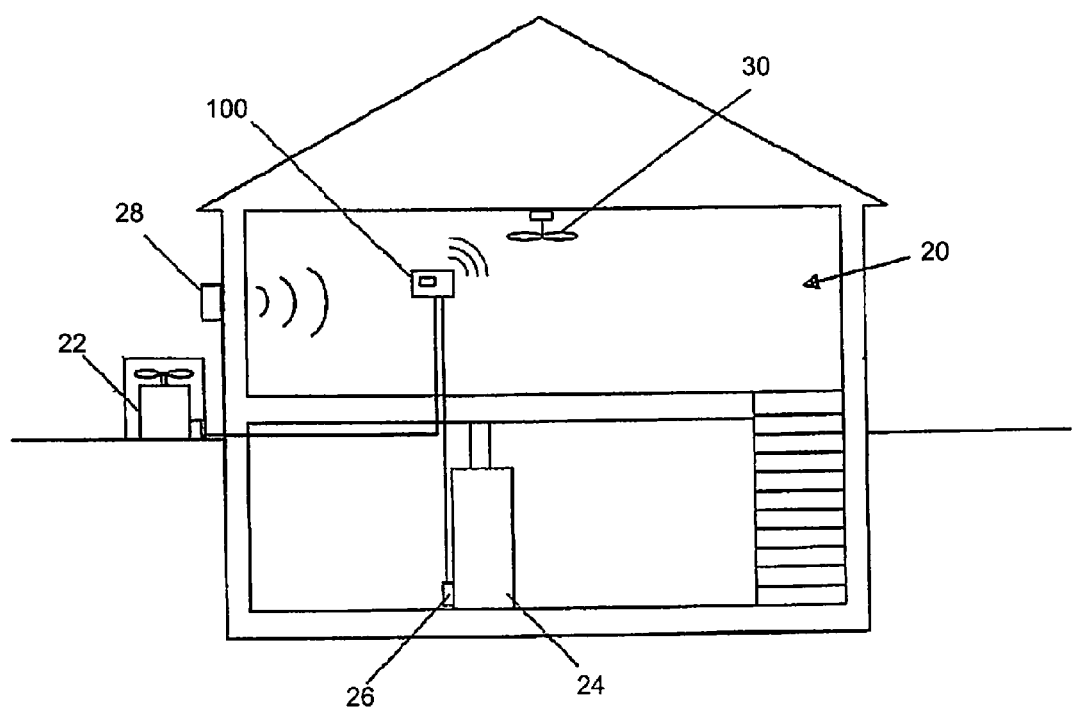

FIG. 6 shows the display of the thermostat in FIG. 3 including the display of a user selectable field in accordance with principles of the present disclosure; and FIG. 7 is an illustration of another building incorporating a thermostatic controller or thermostat according to the principles of the present disclosure, where the building further includes a ceiling fan and the thermostatic controller or thermostat is shown sending a wireless signal to the ceiling fan.

Corresponding reference numerals indicate corresponding parts throughout the several views of the drawings.

DETAILED DESCRIPTION

Figure 1:
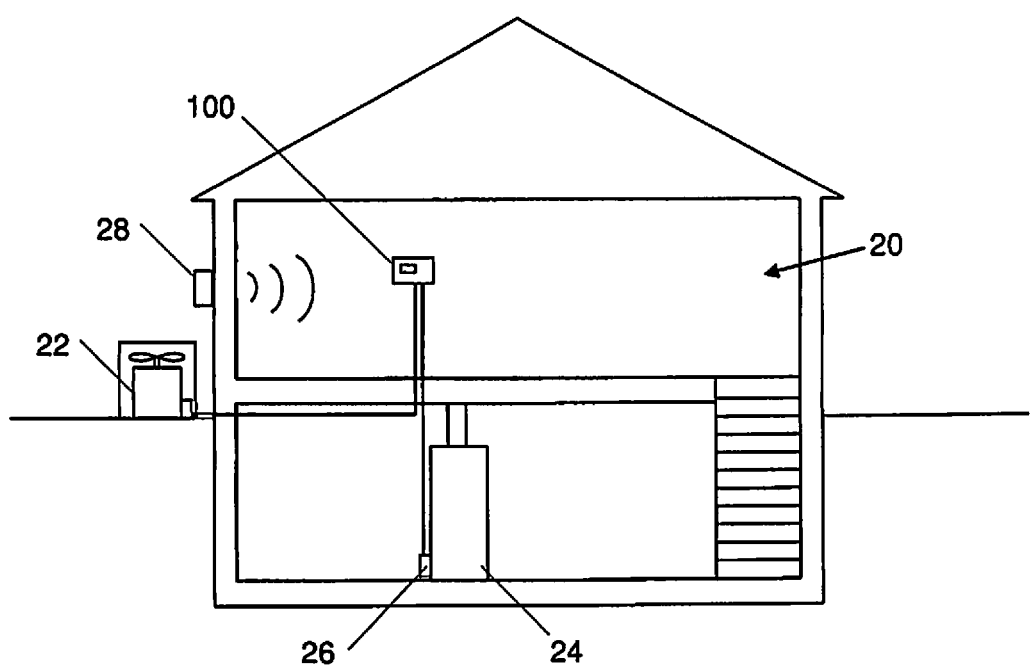
FIG. 1 is an illustration of a building incorporating a thermostat according to the principles of the present disclosure.

In various exemplary embodiments, a thermostatic controller comprises a thermostat operable for curtailing air conditioner operation during times when an energy price rate is relatively high. In other exemplary embodiments, the thermostatic controller may be connected to additional or different systems or energy consuming appliances such as shown in FIG. 1, e.g., an air conditioner system 22 for cooling a space 20, a controller 26 for a water heater 24 (e.g., electric water heater, etc.), a spa water heater (not shown), a pool water heater (not shown), a ceiling fan 30 (shown in FIG. 7), etc. In such examples, the thermostatic controller may be operable for curtailing operation of the heater or other energy consuming appliance during times when an energy price rate is relatively high.

FIG. 1 illustrates an exemplary embodiment of a thermostatic controller that comprises a thermostat 100 for curtailing air conditioner operation when energy price rate is high. In this exemplary embodiment, the thermostat 100 is capable of sensing a temperature in a space 20 and controlling the operation of the air conditioner 22 to cool the space 20. Accordingly, the thermostat 100 may comprise at least one temperature responsive device that periodically outputs a value indicative of the temperature in the space.

The sensor may be any of a number of sensor types, and may comprise a crystal, oscillator or other electronic device with a reactance or frequency that changes in response to temperature. Alternatively, the sensor may comprise a thermistor having a resistance value that changes in response to changes in temperature. The sensor could also be a device capable of communicating a voltage value that correlates to, or is indicative of, the temperature sensed in the space. The sensor may include circuitry to permit the sensor to communicate a value indicative of the temperature that is accurate to a tenth of degree Fahrenheit. The sensor may also include circuitry to enable communication of temperature information on a periodic basis, or upon request, such as when prompted by a microprocessor of the thermostat 100. Accordingly, the at least one sensor is configured to sense and communicate information that is indicative of a temperature in the space 20. The thermostat 100 includes a microprocessor (shown as 130 in FIG. 2) and a program within the microprocessor that utilizes a set point temperature, where the microprocessor is configured to control operation of a thermostat and an air conditioner system 22 to adjust the sensed temperature in the space 20 to maintain the set point temperature.

Figure 2:
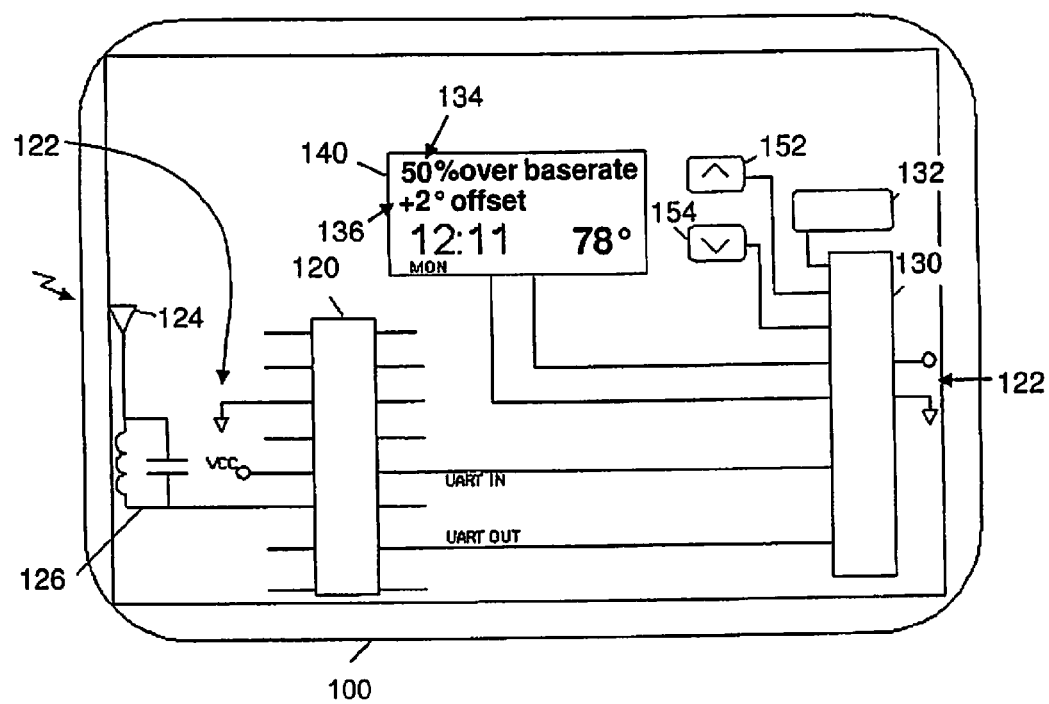
FIG. 2 is a schematic illustration of a first embodiment of a thermostat configured to control operation based on percentage increase in energy price rate in accordance with principles of the present disclosure.

Referring to FIG. 2, the example thermostat 100 includes a receiver device 120 configured to receive a signal transmitted by a utility meter 28 (FIG. 1) outside the space 20 that utilizes an Advanced Metering Infrastructure (AMI) and receives signals from a utility provider that communicate energy price rate information. Specifically, the utility meter 28 may periodically receive signals when a change occurs in energy price rate for a given time period. For example, the utility meter signal may provide real-time energy price rates at intervals of 15 minutes, for example. Different energy price rates may be utilized during various usage rate periods, such as a normal rate period, a low rate period, a medium rate period, and a high rate period, for example. The utility provider could have a tiered structure with as many as 16 energy price rates in a given day. Consequently, the energy price rate may vary considerably from time to time.

The receiver device 120 is configured to receive, at least periodically, a signal wirelessly transmitted by the utility meter 28 that includes information of an energy price rate and/or a given time period associated with the price rate. The receiver device 120 is preferably in communication with the microprocessor 130 of the thermostat 100, where the receiver device 120 and microprocessor 130 are connected to a low voltage power supply 122. The receiver device 120 is generally a receiver chip, which may also be connected to a resistor-capacitor filter circuit 126 and an antenna 124.

The receiver device 120 is configured to receive a short range wireless signal transmitted by the utility meter 28 outside the space 20. The receiver device 120 receives a utility meter signal via the antenna 124, and may compare the signal to a reference signal. For example, the signal may be compared to a local oscillator having a frequency of 418 Megahertz (MHz), and then demodulated into a digital data stream. This data may then be output via a Universal Asynchronous Serial transmission (UART) communication link, and is preferably decoded and transmitted as a serial bit stream signal from a data port pin of the receiver device 120 to an input port pin (such as a UART Port) on the microprocessor 130. The microprocessor 130 may be configured to load the signal data into a software buffer for protocol verification, and configured to strip the data and analyze a synchronization bit at the beginning of the signal to synchronize the transmitted signal and the utility meter 28 for identifying the unique serial number within the transmission to verify signal protocol with a serial number of a specific utility meter. When protocol verification of the transmitted signal is completed and the signal for the utility meter 28 is verified, the microprocessor 130 receives the data including information of a usage price rate, or alternatively a schedule of usage time periods and corresponding tiered energy price rates. The microprocessor 130 stores the energy price rate information in an electronic memory 132, such as an EEPROM (electronically erasable programmable read only memory) memory associated with the microprocessor 130 but may alternatively store the information in a different type of memory and/or an electronic memory external to the microprocessor 130.

In addition, the receiver device 120 may further comprise a transmitter, where the transmitter and receiver device 120 may be provided as a single unit (e.g., a transceiver). Accordingly, the signal received by the receiver device 120 includes energy price rate information, and the receiver device 120 and electronic memory 132 are in communication with the microprocessor 130 so as to permit one or more energy price rates to be received and stored in the electronic memory 132.

As previously stated, the thermostat 100 includes a microprocessor 130 that is programmable to control operation of at least an air conditioner system to maintain a desired set point temperature. In this example, the microprocessor 130 includes a memory (e.g., a read-only-memory, etc.) encoded with an instruction operable to select from one or more energy price rates stored in the electronic memory 132 the lowest energy price rate received in a given time period, for establishing a base energy price rate. For example, the instruction may be configured to select the lowest energy price rate received within a 24 hour period, and to utilize the lowest price rate to establish a base energy price rate for a 24 hour period. The memory is further encoded with an instruction operable to determine if the most recently received energy price rate for the present time period exceeds the established base energy price rate by more than a first percentage of the base energy price rate, where the first percentage is a user-selectable percentage. For example, the instruction may be operable to determine if an energy price rate of $0.20 per kilowatt-hour exceeds a base energy price rate of $0.12 per kilowatt-hour by more than 50 percent (an example of a selected first percentage) of the $0.12 per kilowatt-hour base price rate.

Accordingly, the microprocessor 130 is configured to detect an energy price rate for the present time that exceeds the base energy price rate by more than a first percentage 134 (shown in FIG. 2), and to respond by selecting a first temperature offset 136 (shown in FIG. 2) corresponding to the first percentage 134, and incrementing the set point temperature by the first temperature offset 136. Such an offset would result in increasing the set point temperature above the sensed temperature of the space to be cooled, so that the cooling requirement would be satisfied and the air conditioner system would thereby remain off until the sensed temperature rises above the increased set point temperature. Thus, the first percentage 134 and corresponding first temperature offset 136 provide for reduced energy consumption and reduced energy costs when energy price rates are high. The first percentage 134 is preferably at least 20 percent, and the first temperature offset 136 is preferably within the range of 1 to 20 degrees Fahrenheit.

The thermostat 100 may also provide the user with the capability of overriding a set point temperature that has been offset by the first temperature offset 136. If the user of the thermostat 100 occupying the space prefers to lower the set point temperature for comfort reasons, the user may press a temperature up button 152 or a temperature down button 154 to adjust the current temperature setting (which may have been offset due to an increased price rate). This could effect a temporary override of a set point temperature that has been offset by the first temperature offset 136. The temporary override would remain in effect for a predetermined period of time, such as 2 hours, or until the next usage rate period, for example. The microprocessor 130 may also be configured for two-way communication via the UART port, to transmit a signal via the transceiver/receiver device 120 notifying the utility provider of an override. The utility provider would then be made aware of the lack of reduction in energy consumption of a particular user.

The thermostat 100 may further include a display device 140 such as an liquid crystal display (LCD) device in communication with the microprocessor 130, which is configured to display information such as the current time and temperature setting, or the current usage energy price rate period as normal, low, medium, or high. The display device 140 is preferably configured to display the first percentage 134, to provide for display of an easily discernible cost impact associated with an energy price rate that exceeds the base energy price rate by more than the first percentage 134. The display device 140 is further configured to display the first percentage 134 and at least one user-selectable field for aiding the user in selecting a first temperature offset 136 for reducing energy costs when an energy price rate exceeds the base energy price rate by the first percentage 134. The at least one user-selectable field on the display device allows for input of the user-selectable first percentage 134 and corresponding user-selectable first temperature offset 136. The at least one user-selectable field on the display device 140 accordingly enables a user to select a threshold as a percentage 134 of the base energy price rate at which the user desires the set point temperature to be incremented by the first temperature offset 136 for reducing energy consumption to lower energy costs.

By displaying the first percentage 134 to provide an easily discernible cost impact associated with an energy price rate that is more than the first percentage 134 above the base rate, the thermostat user would then be able to determine whether an override would affect the energy costs that the user would be billed for. In this manner, the user would be able to determine how an override of the first temperature offset to the set point temperature would affect the user's energy costs, whereby the display would cause the user to be less likely to override the temperature offset to the set point temperature. Because the thermostat 100 is configured to display a high energy price rate as a percentage of a base energy price rate that is easily discernible, the user would be less likely to opt out or override the temperature offset to the set point temperature for reducing air conditioner operation. Accordingly, the thermostat 100 provides a utility provider with a reliable way to curtail or reduce energy consumption using high energy price rates during a peak demand period (to keep energy demands within their generating capacity during the peak period), and also provides a user with a reliable way of controlling air conditioner operation during high energy price periods to reduce the user's energy costs.

In addition to the above features, the receiver device 120 of the thermostat 100 may comprise a transceiver configured to transmit signals. In which case, the microprocessor 130 may respond to an energy price rate exceeding the base energy price rate by more than the first percentage by transmitting a signal via the transceiver to an energy consuming appliance indicating that the appliance should be in an off state. Conversely, the microprocessor 130 may respond to an energy price rate that is below the base energy price rate, e.g., below by more than the first percentage, by transmitting a signal via the transceiver to the energy consuming appliance indicating that the appliance should be in an on state. By way of example, the energy consuming appliance may be an electric water heater appliance. In this example, the microprocessor 130 may respond to an energy price rate exceeding the base energy price rate by more than the first percentage by transmitting an off command via the transceiver to an energy consuming electric water heater appliance, to thereby further reduce energy costs. In this example, the thermostat 100 may also be referred to as a thermostatic controller as it is operable for controlling the operation of the water heater.

Referring to FIG. 3, a second embodiment of a thermostat 200 according to the present disclosure is shown. The thermostat 200 includes the same components in the first thermostat embodiment shown in FIG. 2, in particular, a receiver device 120 configured to receive a signal transmitted by a utility meter 28 that includes energy price rate information, and an electronic memory 132 in communication with a microprocessor 130 so as to permit one or more energy price rates to be received and stored in the electronic memory 132.

The second embodiment of a thermostat 200 includes the same microprocessor 130 in the first embodiment, which includes a memory encoded with an instruction operable to select from one or more energy price rates stored in the electronic memory 132 the lowest energy price rate received in a given time period for establishing a base energy price rate. The is further encoded with an instruction operable to determine if the most recently received energy price rate for the present time period exceeds the base energy price rate by more than a first percentage of the base energy price rate.

The thermostat 200 that includes the microprocessor 130 in FIG. 2 is configured to detect an energy price rate for the present time that exceeds the base energy price rate by more than a first percentage or multiplier factor 234 shown on display 240 in FIG. 3, and to respond by selecting a first temperature offset 236 corresponding to the first percentage or multiplier factor 234 and incrementing the set point temperature by the first temperature offset 236. Such an offset would result in increasing the set point temperature above the sensed temperature of the space, so that the cooling requirement would be satisfied and cause the air conditioner system to remain off until the sensed temperature rises above the increased set point temperature. Thus, the first percentage or multiplier factor 234 and corresponding first temperature offset 236 thereby reduce energy consumption and energy costs when energy price rates are high. The first percentage or multiplier factor 234 is preferably at least 20 percent over the base rate, and more preferably at least 50 percent. Similarly, the first temperature offset 236 is preferably in the range of 1 to 20 degrees Fahrenheit.

In addition to the above curtailment feature, the second embodiment of a thermostat 200 includes a memory (e.g., read-only-memory, etc.) that is further encoded with an instruction operable to determine if the energy price rate for the present time period exceeds the base energy price rate by more than a second percentage or multiplier factor 244, wherein the microprocessor is configured to responsively select a second temperature offset 246 corresponding to the second percentage or multiplier factor 244 and increment the set point temperature by the second temperature offset 246. The second percentage 244 is at least 50 percent over the base rate (and more preferably at least 100 percent), and the second temperature offset 246 is preferably in the range of between 2 to 20 degrees Fahrenheit. The second embodiment of a thermostat 200 may further include a third percentage or multiplier factor 254 and a corresponding third temperature offset 256 that are each respectively greater than the second multiplier factor 244 and second temperature offset 246. In addition to the above curtailment feature, the second embodiment of a thermostat 200 includes a memory (e.g., read-only-memory, etc.) that is further encoded with an instruction operable to determine if the energy price rate for the present time period exceeds the base energy price rate by more than a second percentage or multiplier factor 244, wherein the microprocessor is configured to responsively select a second temperature offset 246 corresponding to the second percentage or multiplier factor 244 and increment the set point temperature by the second temperature offset 246. The second percentage 244 is at least 50 percent over the base rate (and more preferably at least 100 percent), and the second temperature offset 246 is preferably in the range of between 2 to 20 degrees Fahrenheit. The second embodiment of a thermostat 200 may further include a third percentage or multiplier factor 254 and a corresponding third temperature offset 256 that are each respectively greater than the second percentage or multiplier factor 244 and second temperature offset 246.

The second embodiment of a thermostat 200 may also provide the user with the capability of overriding an increased set point temperature that was offset by the first temperature offset 236, second temperature offset 246, or any additional temperature offsets. If the user of the thermostat occupying the space prefers to lower the set point temperature for comfort reasons, the user may press a temperature up or down buttons 252 to adjust the current temperature setting to a desired level, which would effect a temporary override of the increased set point temperature offset by the first temperature offset 236 or other additional temperature offsets. The temporary override would remain in effect for a predetermined period of time, such as 2 hours, or until the next usage rate period.

The second embodiment of a thermostat 200 includes a display device 240 such as an LCD display in communication with the microprocessor, which is configured to display the first percentage or multiplier factor 234, to provide for display of an easily discernible cost impact associated with an energy price rate that exceeds the base energy price rate by more than the first percentage or multiplier factor 234. The display device 240 is further configured to display the first percentage or multiplier factor 234 and at least one user-selectable field 242 for aiding the user in selecting a first temperature offset 236 for reducing energy costs when an energy price rate exceeds the base energy price rate by the first percentage or multiplier factor 234. The at least one user-selectable field 242 on the display device allows for input of the user-selectable first percentage or multiplier factor 234 and corresponding user-selectable first temperature offset 236. The user-selectable fields 242 on the display device 240 accordingly enable a user to select a threshold as a percentage or multiplier factor 234 of the base energy price rate at which the user desires the set point temperature to be incremented by one or more temperature offsets 236, 246 and 256 for reducing energy consumption to lower energy costs.

By displaying the first percentage or multiplier factor 234 to provide an easily discernible cost impact associated with an energy price rate that is more than the first percentage 234 above the base rate, the thermostat user would then be able to determine whether an override would affect the energy costs that the user would be billed for. In this manner, the user would be able to determine how an override of the first temperature offset to the set point temperature would affect the user's energy costs, whereby the display would cause the user to be less likely to override the temperature offset to the set point temperature. Because the thermostat 200 is configured to display a high energy price rate as a percentage or multiplier factor of a base energy price rate that is easily discernible, the user would be less likely to opt out or override the temperature offset to the set point temperature for reducing air conditioner operation. Accordingly, the thermostat 100 provides a utility provider with a reliable way to curtail or reduce energy consumption using high energy price rates during a peak demand period (to keep energy demands within their generating capacity during the peak period), and also provides a user with a reliable way of controlling air conditioner operation during high energy price periods to reduce the user's energy costs.

The thermostat 200 may further be configured to control operation of one or more energy consuming appliances such as an electric water heater 24, a pool water heater, a spa water heater, one or more ceiling fans, etc. With control of such appliances, the thermostat 200 can listen to the energy price rate signals from the utility meter and automatically turn off energy consuming devices when user defined percentages or price thresholds have been surpassed. The receiver device preferably comprises a transceiver configured to receive and transmit signals. And, the microprocessor is configured to respond to an energy price rate that exceeds the base energy price rate by more than the first percentage or multiplier factor by transmitting an off command via the transceiver/receiver device to an energy consuming electric water heater appliance, to thereby reduce energy costs. Conversely, the microprocessor may be configured to respond to an energy price rate that is below the base energy price rate, e.g., below by more than the first percentage, by transmitting an on command via the transceiver to the energy consuming electric water heater. In this example, the thermostat 200 may also be referred to as a thermostatic controller as it is operable for controlling the operation of the water heater.

Alternatively, the thermostat 200 may further be configured to include a connection with a contactor 26 that the thermostat 200 can switch on and off to connect or disconnect the supply of power to an electric water heater 24, to thereby control the operation of the water heater 24. The thermostat 200 may be similarly connected to a second contactor for controlling power to a pool water heater, spa water heater, one or more ceiling fans, etc. in the same manner. In this manner, the thermostat 200 can control the operating level of one or more energy consuming appliances or systems. The thermostat 200 is not required to be connected to such systems, however, and may operate independent of a connection to such systems.

The applicants have found through research that the energy price rate per kilowatt-hour has little psychological impact on consumers as a metric unto itself. Most homeowners cannot infer what a rate of $0.12 per kilowatt-hour versus a rate of $0.14 per kilowatt-hour would translate to in terms of their monthly energy bill. The applicants have developed an approach for automated price response which is predicated on the delta or percentage difference from a base energy price rate, as this information is more easily discerned by consumers. The approach utilized by the thermostatic controller embodiments of the present disclosure enable consumers to set their price thresholds in terms of a percent increase, or multiple, over a base energy price rate, where the base energy price rate is defined as the lowest rate in the last 24 hour period.

Figure 4:
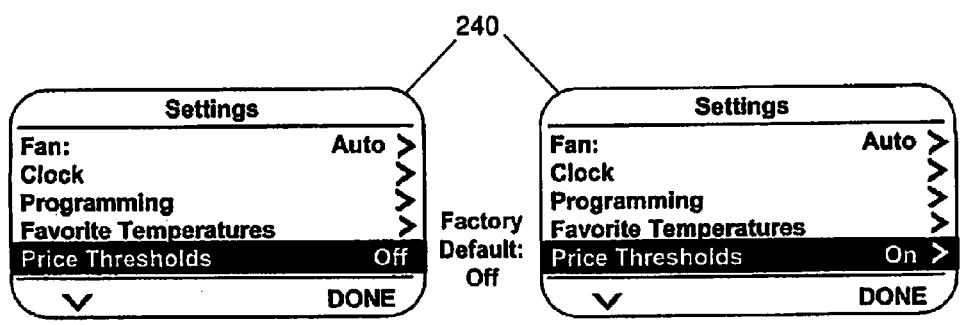
FIG. 4 shows the display of the thermostat in FIG. 3 including the display of a setting menu.
Figure 5:
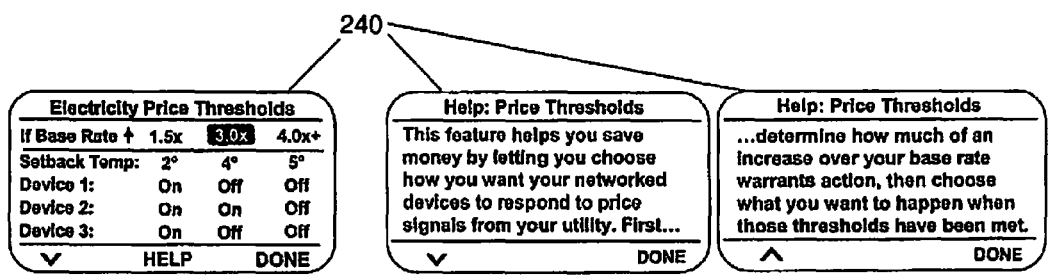
FIG. 5 shows the display in FIG. 3 including a help screen.

Referring to FIG. 4, the thermostat 200 receives variable energy price rate signals from the AMI utility meter that the thermostat 200 will listen to and respond to automatically, to maximize the effectiveness of price/demand response. The price threshold feature of the thermostat 200 enables the user to program how to respond to the price signals. The thermostat 200 includes user input buttons, such as arrows 252, that the user may use to turn price thresholds 'On,' which may prompt the display of an arrow icon to the right of the word 'On,' as shown in FIG. 4. The user may also select a 'Help' icon that will prompt the display of a help screen as shown in FIG. 5, which includes information to help the user to understand the process. The user utilizes inputs 252 to move up or down through the menu options one at a time, and the right arrow will take the user to the set up screen for the selected menu option, which may be for input of the first percentage or multiplier factor and first temperature offset as shown in FIG. 6.

Referring to FIGS. 3-6, once the user has set the price thresholds to 'On' via the input buttons 252, the thermostat 200 is configured to display a threshold screen that includes the display of the first percentage or multiplier factor 234, second percentage or multiplier factor 244, and third percentage or multiplier factor 254, and their corresponding first temperature offset 236, second temperature offset 246, and third temperature offset 256. The thermostat 200 will obtain the lowest energy price rate received in the last 24 hours, and may display this rate as the base energy rate. The user of the thermostat 200 may utilize the input buttons 252 to scroll through the user input fields 242 to allow the user/homeowner to set the first, second, or third percentages or multiplier factors 234, 244, and 254, which serve as threshold or trigger points for incrementing the set point temperature by the corresponding temperature offsets 236, 246, and 256.

In addition, the display device 240 displays one or more commands associated with energy consuming device 1, energy consuming device 2, and energy consuming device 3. This allows the user to set thresholds for automatically switching on and off an electric water heater 24, for example, to reduce the operation of the water heater 24. In this manner, the thermostat 200 can control the operating level of one or more energy consuming appliances or systems, to further reduce energy costs during high energy price rate periods.

As described above, FIGS. 2 and 3 show first and second exemplary embodiments of thermostat 100, 200, respectively, that may be operable for controlling operation of a heating ventilation and air-conditioning (HVAC) system, e.g., that includes air conditioner system 22, etc. These illustrated thermostats 100, 200 are two examples of a controller that are usable in accordance with principles of the present disclosure for load reduction based on percentage change in energy price. Other controllers may also be used in other embodiments, including other thermostats and other thermostatic controllers operable for controlling a wide range of energy consuming appliances. For example, other exemplary embodiments may include a thermostatic controller that is operable as a control for a water heater (e.g., electronic water heater, etc.), pool water heater, spa water heater, one or more ceiling fans, etc. whereby the thermostatic controller is operable for curtailing load of the heater or ceiling fan when energy price rate is high. Accordingly, aspects of the present disclosure should not be limited solely to thermostats or to just curtailment of air conditioner load.

In an exemplary embodiment, there is a thermostatic controller operable as a control for a water heater. In this example, the thermostatic controller is operable for curtailing the load of the water heater when energy price rate is high. The thermostatic controller includes a receiver device, a memory, and a microprocessor. The receiver device is configured to receive a signal that includes an energy price rate for a given time period. One or more energy price rates received by the receiver device are stored in the memory. The microprocessor is configured to control operation of the water heater to maintain a set point temperature of the water that is heated by the water heater. The microprocessor is configured to select from the lowest energy price rate received within a given time period for establishing a base energy price rate, and also to determine if the energy price rate for a present time period exceeds the base energy price rate by more than a first percentage of the base energy price rate. The microprocessor is further configured to respond to an energy price rate that exceeds the base energy price rate by more than the first percentage by selecting a first temperature offset corresponding to the first percentage and decreasing the set point temperature by the first temperature offset. The decreased set point temperature of the water to be heated would curtail or reduce the operation of the heater and reduce energy costs during high energy price rate periods.

In another exemplary embodiment, there is a thermostatic controller, e.g., a wireless thermostat, etc. that is also operable for curtailing load of one or more ceiling fans. In this example, the thermostatic controller includes a transceiver configured to receive a signal that includes an energy price rate for a given time period and an electronic memory device in which one or more energy price rates received by the transceiver are stored. A microprocessor is in communication with the transceiver and electronic memory. The microprocessor configured to select from the one or more energy price rates the lowest energy price rate received within a given time period for establishing a base energy price rate; determine if the energy price rate for a present time period exceeds the base energy price rate by more than a first percentage of the base energy price rate; and respond to an energy price rate that exceeds the base energy price rate by more than the first percentage by transmitting a signal via the transceiver to one or more ceiling fans to activate, deactivate and/or change speed of the one or more ceiling fans. Accordingly, the thermostatic controller is operable to activate, deactivate, and/or change speed of the one or more ceiling fans as a function of a base energy price rate increase.

By way of example, the thermostatic controller may be configured to respond to an energy price rate that exceeds the base energy price rate by more than the first percentage (e.g., 50%, etc.) by transmitting a signal via the transceiver to the one or more ceiling fans indicating that the one or more ceiling fans should be operating at a low speed. If the energy price rate exceeds the base energy price rate by more than a second percentage (e.g., 100%, etc.), which is higher than the first percentage, a signal may be transmitted via the transceiver to the one or more ceiling fans indicating that the one or more ceiling fans should be operating at a medium speed which is higher than the low speed. And, if the energy price rate exceeds the base energy price rate by more than a third percentage (e.g., 150%, etc.), which is higher than the second percentage, a signal may be transmitted via the transceiver to the one or more ceiling fans indicating that the one or more ceiling fans should be operating at a high speed which is higher than the medium speed.

FIG. 7 is an illustration of another building incorporating a thermostatic controller or thermostat 100 according to the principles of the present disclosure, where the building further includes a ceiling fan 30 and the thermostatic controller or thermostat 100 is shown sending a wireless signal to the ceiling fan 30. Also shown in FIG. 7 are an air conditioner system 22 for cooling a space 20, a water heater 24 having a controller 26, and a utility meter 28 as described above.

With further regard to FIG. 7, the thermostatic controller 100 is operable for switching on/off the ceiling fan 30 as a function of the tier rate. In this example, the thermostat user could select to have the thermostat turn on the ceiling fan 30 via one of the device settings as shown in FIG. 3, for example. The user could select to have the thermostat 100 communicate an ON signal to a device "ceiling fan—device 1" if the setback as a function of the rate increase was 3° or greater, etc. The user could also select to have the ceiling fan come on for all three setback temperatures, connected to base rate increases, or any combination of the three. The communication between the thermostat 100 and ceiling fan 30 may preferably be wireless as shown in FIG. 7, which wireless method may be based on Bluetooth, Z-wave, or other comparable protocol.

In addition, there may be more than one ceiling fan in the conditioned space 20. In such example, and with reference to FIG. 3, Device 1 may perhaps be a ceiling fan in the kitchen, Device 2 may be a ceiling fan in the living room, and Device 3 may be a ceiling fan in a bedroom, for example. The user could select which fans to turn ON or OFF as a function of the location of the given fan, as a function of the chosen setback, invoked by the select rate increase.

In addition, the thermostat may communicate a signal indicative of the fan speed as a function of the temperature setback invoked by the rate increase. For example, referring to FIG. 3, a rate increase of 50% will cause the thermostat to communicate a Low Speed ON signal to Device 1, which is a ceiling fan in this example. A rate increase of 100% will cause the thermostat (or thermostatic controller) to communicate a Medium Speed ON signal to the Device 1 ceiling fan. And, a rate increase of 150% will cause the thermostatic controller to communicate a High Speed ON signal to the Device 1 ceiling fan. Accordingly, aspects of the present disclosure include thermostatic controllers able to activate, deactivate, and/or change one or more speeds of one or more ceiling fans as a function of a base rate increase.

Various exemplary embodiments of a controller for a variable output heating apparatus are provided, which may be connected to either a single stage or a two-stage thermostat. An exemplary embodiment of a thermostat includes a receiver device configured to receive a signal including energy price rate information. The thermostat also includes an electronic memory device in which one or more energy price rates received by the receiver device are stored. The thermostat further includes a microprocessor in communication with the receiver device and electronic memory. The microprocessor is configured to control operation of an air conditioner system to maintain a set point temperature for a space. The microprocessor includes a memory encoded with an instruction operable to select from the one or more energy price rates the lowest energy price rate received within a given time period for establishing a base energy price rate, and further encoded with an instruction operable to determine if the energy price rate for a present time period exceeds the base energy price rate by more than a first percentage of the base energy price rate. The microprocessor is configured to respond to an energy price rate that exceeds the base energy price rate by more than the first percentage by selecting a first temperature offset corresponding to the first percentage and increasing the set point temperature by the first temperature offset, whereby the increased set point temperature reduces energy consumption when an energy price rate is significantly higher than the base energy price rate.

In an exemplary embodiment, there is a thermostat capable of receiving signals transmitted by a utility provider communicating a usage rate schedule or a request for a load curtailment period, and controlling one or more systems based on the information communicated by the utility provider. In this example, the thermostat changes the set point for each system to the stored predetermined control set point corresponding to the current usage rate schedule period or the curtailment mode period when requested. Also in this example, the thermostat is further capable of discontinuing operation of one or more systems for a minimum predetermined time period following a request for a load curtailment period.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A thermostatic controller comprising:
 a transceiver configured to receive a signal that includes an energy price rate for a given time period;
 an electronic memory device in which one or more energy price rates received by the transceiver are stored; and a microprocessor in communication with the transceiver and electronic memory, the microprocessor configured to:
- select from the one or more energy price rates the lowest energy price rate received within a given time period for establishing a base energy price rate;
- determine if the energy price rate for a present time period exceeds the base energy price rate by more than a first percentage or multiplier factor of the base energy price rate; and
- respond to an energy price rate that exceeds the base energy price rate by more than the first percentage or multiplier factor by transmitting a signal via the transceiver to an energy consuming appliance indicating that the energy consuming appliance should be in an off state and/or to one or more ceiling fans to activate, deactivate and/or change speed of the one or more ceiling fans;

wherein the microprocessor is configured to respond to an energy price rate that exceeds the base energy price rate by more than the first percentage or multiplier factor by transmitting a signal via the transceiver to an energy consuming appliance indicating that the energy consuming appliance should be in an off state; and wherein the microprocessor is configured to respond to an energy price rate that is below the base energy price rate by more than the first percentage or multiplier factor by transmitting a signal via the transceiver to the energy consuming appliance indicating that the energy consuming appliance should be in an on state.

2. The thermostatic controller of claim 1, wherein the thermostatic controller comprises:
- a thermostat for controlling operation of one or more energy consuming appliances of a heating ventilation and air-conditioning (HVAC) system; and/or
- a control for a water heater; and/or
- a control for a pool water heater; and/or
- a control for a spa water heater; and/or
- a control for a ceiling fan.

3. The thermostatic controller of claim 1, wherein the microprocessor is configured to respond to an energy price rate that exceeds the base energy price rate by more than the first percentage or multiplier factor by transmitting a signal via the transceiver to one or more ceiling fans to activate, deactivate and/or change speed of the one or more ceiling fans.

4. The thermostatic controller of claim 3, wherein the thermostatic controller is operable to activate, deactivate, and/or change speed of the one or more ceiling fans as a function of a base energy price rate increase.

5. The thermostatic controller of claim 1, wherein the microprocessor is operable to select the lowest energy price rate received within a 24 hour period, which lowest energy price rate is utilized to establish the base energy price rate.

6. The thermostatic controller of claim 1, wherein the first percentage or multiplier factor is a user-selectable percentage that is selectable as a value of at least 20 percent or a user-selectable multiplier factor that is selectable as a value of at least 1.5.

7. The thermostatic controller of claim 1, further comprising a display device that is configured to:
- display user-selectable fields for input of a user-selectable percentage or user-selectable multiplier factor, to enable a user to select a threshold as a percentage or multiplier factor of the base energy price rate; and/or
- display the first percentage or multiplier factor, to provide for display of an easily discernible cost impact associated with an energy price rate that exceeds the base energy price rate by more than the first percentage or multiplier factor.

8. The thermostatic controller of claim 1, wherein the thermostatic controller is operable for curtailing load of one or more energy consuming appliances when energy price rate is high, and wherein the thermostatic controller includes a connection with a contactor by which the thermostatic controller can switch on and off to connect or disconnect a supply of power to an energy consuming appliance to thereby control operation of the energy consuming appliance.

9. A heating ventilation and air-conditioning (HVAC) system comprising one or more energy consuming appliances and the thermostatic controller of claim 1, wherein the thermostatic controller comprises a thermostat for controlling operation of the one or more energy consuming appliances of the HVAC system.

10. A thermostatic controller comprising:
- a transceiver configured to receive a signal that includes an energy price rate for a given time period;
- an electronic memory device in which one or more energy price rates received by the transceiver are stored; and
- a microprocessor in communication with the transceiver and electronic memory, the microprocessor configured to:
  - select from the one or more energy price rates the lowest energy price rate received within a given time period for establishing a base energy price rate;
  - determine if the energy price rate for a present time period exceeds the base energy price rate by more than a first percentage or multiplier factor of the base energy price rate; and
  - respond to an energy price rate that exceeds the base energy price rate by more than the first percentage or multiplier factor by transmitting a signal via the transceiver to an energy consuming appliance indicating that the energy consuming appliance should be in an off state and/or to one or more ceiling fans to activate, deactivate and/or change speed of the one or more ceiling fans;

wherein the thermostatic controller is configured to respond:
- to an energy price rate that exceeds the base energy price rate by more than the first percentage or multiplier factor by transmitting a signal via the transceiver to the one or more ceiling fans indicating that the one or more ceiling fans should be operating at a low speed;
- to an energy price rate that exceeds the base energy price rate by more than a second percentage or multiplier factor which is higher than the first percentage or multiplier factor by transmitting a signal via the transceiver to the one or more ceiling fans indicating that the one or more ceiling fans should be operating at a medium speed which is higher than the low speed; and
- to an energy price rate that exceeds the base energy price rate by more than a third percentage or multiplier factor which is higher than the second percentage or multiplier factor by transmitting a signal via the transceiver to the one or more ceiling fans indicating that the one or more ceiling fans should be operating at a high speed which is higher than the medium speed.

11. The thermostatic controller of claim 10, wherein the microprocessor is configured to respond to an energy price rate that exceeds the base energy price rate by more than the first percentage or multiplier factor by transmitting a signal via the transceiver to an energy consuming appliance indicating that the energy consuming appliance should be in an off state.

12. The thermostatic controller of claim 11, wherein the microprocessor is configured to respond to an energy price rate that is below the base energy price rate by more than the first percentage or multiplier factor by transmitting a signal via the transceiver to the energy consuming appliance indicating that the energy consuming appliance should be in an on state.

13. A method of using a thermostatic controller, the method comprising:
    receiving a signal that includes an energy price rate for a given time period;
    storing one or more energy price rates in an electronic memory;
    selecting a lowest energy price rate received within a given period of time from the one or more energy price rates stored in the electronic memory by using a microprocessor in communication with the electronic memory, for establishing a base energy price rate;
    determining, using the microprocessor, if the energy price rate for a present time period exceeds the base energy price rate by more than a first percentage or multiplier factor of the base energy price rate; and
    responding to an energy price rate that exceeds the base energy price rate by more than the first percentage or multiplier factor by transmitting a signal from the thermostatic controller to an energy consuming appliance indicating that the energy consuming appliance should be in an off state and/or to one or more ceiling fans to activate, deactivate, and/or change speed of the one or more ceiling fans;
    wherein the method includes responding to an energy price rate that exceeds the base energy price rate by more than the first percentage or multiplier factor by transmitting a signal from the thermostatic controller to one or more ceiling fans to activate, deactivate, and/or change speed of the one or more ceiling fans to thereby help reduce energy consumption; and
    wherein the method includes:
    responding to an energy price rate that exceeds the base energy price rate by more than the first percentage or multiplier factor by transmitting a signal from the thermostatic controller to the one or more ceiling fans indicating that the one or more ceiling fans should be operating at a low speed;
    responding to an energy price rate that exceeds the base energy price rate by more than a second percentage or multiplier factor which is higher than the first percentage or multiplier factor by transmitting a signal from the thermostatic controller to the one or more ceiling fans indicating that the one or more ceiling fans should be operating at a medium speed which is higher than the low speed; and
    responding to an energy price rate that exceeds the base energy price rate by more than a third percentage or multiplier factor which is higher than the second percentage or multiplier factor by transmitting a signal from the thermostatic controller to the one or more ceiling fans indicating that the one or more ceiling fans should be operating at a high speed which is higher than the medium speed.

14. The method of claim 13, wherein the method includes responding to an energy price rate that exceeds the base energy price rate by more than the first percentage or multiplier factor by transmitting a signal from the thermostatic controller to an energy consuming appliance indicating that the energy consuming appliance should be in an off state.

* * * * *